Feb. 6, 1962 — M. R. LONG — 3,019,545
SINKER
Filed July 11, 1960
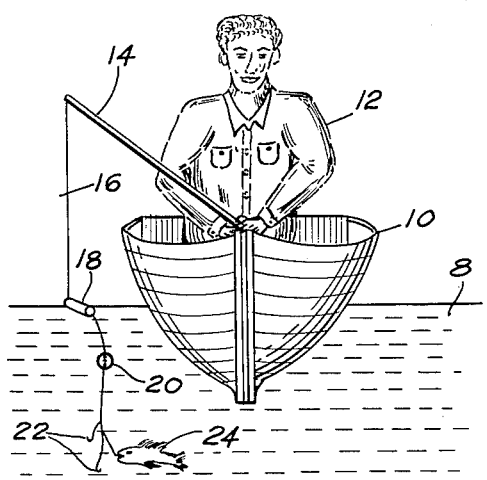
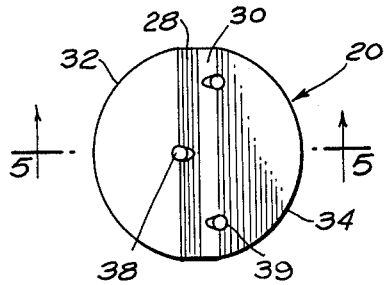
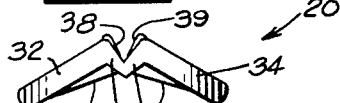
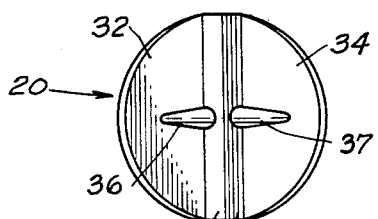
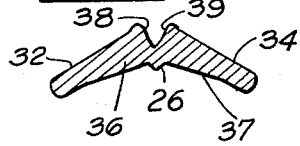
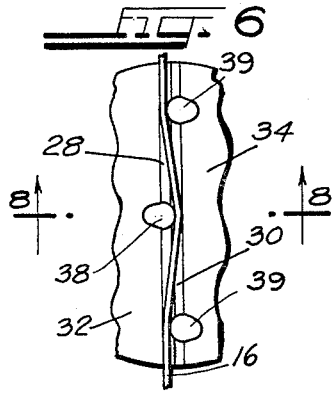
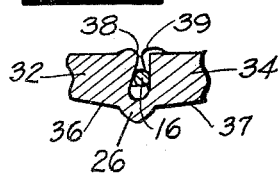
INVENTOR.
MARION R. LONG
BY
Prangley, Baird, Clayton, Miller & Vogel
ATTYS.

United States Patent Office 3,019,545
Patented Feb. 6, 1962

3,019,545
SINKER
Marion R. Long, 220 N. 21st St., New Castle, Ind.
Filed July 11, 1960, Ser. No. 41,926
4 Claims. (Cl. 43—44.89)

This invention relates to fishing apparatus and particularly to sinkers that are adapted to be attached to fishing lines so as to cause the fishing lines to assume a predetermined position in the water.

The sinkers provided heretofore required the use of a tool such as pliers to attach the sinkers to the fishing lines. To detach the prior sinkers from the fishing lines, the use of a second tool such as a knife was required. Hence, when using the sinkers provided heretofore the fisherman was required to carry two additional tools in his tackle box. In accordance with the present invention, it is desired to provide a sinker which will perform all of the functions of the prior sinkers with certain additional advantages.

More particularly, it is an important object of the present invention to provide an improved sinker that can be readily attached or detached from a fishing line without the use of tools of any sort.

Another object of the invention is to provide an improved sinker comprising a bendable connection, two gripping portions, and a pair of wings of a size adapted to be engaged by the fingers whereby the force of the fingers upon the wings is sufficient to deform the bendable connection to move the gripping portions into contact with and securely to grip the fishing line.

Yet another object of the invention is to provide an improved sinker of the type set forth wherein the force of the fingers upon the wings is sufficient to deform the bendable connection to move the gripping portions away from contact with the fishing line to detach the sinker therefrom without the use of any tools.

Still another object of the invention is to provide an improved sinker of the type set forth wherein the cross sectional area of the bendable connection is less than the cross sectional area of the gripping portions and the wings to insure preferential bending in the bendable connection.

A further object of the invention is to provide an improved sinker having lugs upon the gripping portions wherein the fishing line in the attached position is held between the lugs and the opposite gripping portion to give added gripping power.

Further features of the invention pertain to the particular arrangement of the elements of the sinker, whereby the above-outlined and additional operating features thereof are attained.

The invention, both as to its organization and method of operation, together with further objects and advantages thereof, will be better understood by reference to the following specification taken in connection with the accompanying drawing wherein like reference numerals have been used to designate like parts throughout, and in which:

FIGURE 1 is a perspective view showing a boat wherein sits a fisherman holding a fishing rod which guides and supports a fishing line to which is attached a sinker made in accordance with and embodying the principles of the present invention;

FIG. 2 is an enlarged plan view of the sinker shown in FIG. 1 illustrated with the parts thereof in the position before fastening to the fishing line;

FIG. 3 is an end view of the sinker shown in FIG. 2;

FIG. 4 is a plan view of the opposite side of the sinker shown in FIG. 2;

FIG. 5 is a view in cross section taken in the direction of the arrows along the line 5—5 in FIG. 2;

FIG. 6 is an enlarged fragmentary plan view illustrating the sinker attached to a fishing line;

FIG. 7 is an end view of the sinker shown in FIG. 6, the fishing line being shown in section; and FIG. 8 is a view in cross section taken in the direction of the arrows along the line 8—8 in FIG. 6.

Referring now to FIG. 1 of the drawings, there is shown a body of water 8 in which floats a boat 10 wherein sits a fisherman 12 holding a fishing rod 14 which guides and supports a fishing line 16. Attached to the fishing line 16 is a floating bob 18 and a sinker 20 which is made in accordance with and embodies the principles of the present invention. Also attached to the fishing line 16 is a plurality of fish hooks 22, one of which is hooked to a fish 24.

The sinker 20 is illustrated in FIGS. 2 through 5 in the condition thereof before application to a fishing line; it is seen that the sinker 20 comprises generally a first gripping portion 28 connected to a second gripping portion 30 by means of a bendable connection 36, a first wing 32 on the first gripping portion 28, and a second wing 34 on the second gripping portion 30.

The gripping portions 28 and 30 extend longitudinally in facing relationship and have substantially flat rectangular facing surfaces adapted to grip an associated line therebetween. Gripping portions 28 and 30 are normally disposed apart in angular V-shaped relationship of approximately 70° in a first position illustrated in FIGS. 2 to 5 to receive the fishing line 16 therebetween and are movable to a second gripping position as illustrated in FIGS. 6 to 8 to grasp the line 16 in a firm manner. The bendable connection 26 of the sinker 20 interconnects the longitudinally extending gripping portions 28 and 30 along one longitudinally extending edge thereof and accommodates movement thereof from the line receiving position illustrated in FIGS. 2 to 5 to the line gripping position illustrated in FIGS. 6 to 8. To this end the bendable connection 26 has a cross section that is less than that of the gripping portions 28 and 30 to insure preferential bending in the bendable connection 26.

In order to facilitate manual movement of the parts from the position illustrated in FIGS. 2–5 to that illustrated in FIGS. 6–8, the wings 32 and 34 have been provided. The first wing 32 is integrally joined to the longitudinal edge of the first gripping portion 28 disposed opposite the bendable connection 26 and is angularly disposed at approximately a right angle with respect to the first gripping portion 28 and projects outwardly therefrom in a direction away from the second gripping portion 30. The second wing 34 is integrally joined to the longitudinal edge of the second gripping portion 30 disposed opposite the bendable connection 26 and is angularly disposed at approximately a right angle with respect to the second gripping portion 30 and projects outwardly therefrom in a direction away from the first gripping portion 30. In plan view, the first wing 32 and the second wing 34 are substantially semi-circular in shape as shown in FIGS. 2, 4 and 6, and are of a size adapted to be readily grasped by the fingers of the user of the sinker 20.

Referring now to FIG. 4, means is illustrated to rigidify the connection between the gripping portions and the wings further to insure preferential bending in the bendable connection 26. A first rib 36 is shown disposed between the first gripping portion 28 and the first wing 32 adjacent to the bendable connection 26, the first rib 36 being formed integral therewith and projecting outwardly from the bendable connection 26 in a direction away from the second gripping portion 30. It will be seen that the first rib 36 is adapted to stiffen the first gripping portion 28 and the first wing 32 so that any force tending to bend the sinker 20 serves to bend the connection 26. A second rib 38 is disposed between the second gripping portion 30 and the second wing 34 adjacent to the bendable connection 26, the second rib 37 being formed integral therewith and projecting outwardly from the bendable connection 26 in a direction away from the first gripping portion 28. The second rib 37 also is adapted to stiffen the second gripping portion 30 and the second wing 34 in a manner similar to that in which the rib 36 stiffens the gripping portion 28 and the wing 32.

In order to improve the gripping action of the gripping portion 28, a first lug 38 is disposed thereon on the edge thereof disposed away from the bendable connection 26. More particularly, the first lug 38 is disposed substantially in the center of the edge of the longitudinally extending first gripping portion 28 that is disposed away from the bendable connection 26. The first lug 38 projects outwardly from the first gripping portion 28 in a direction towards the second gripping portion 30 and is disposed in perpendicular relationship with but spaced from the bendable connection 26. A pair of second lugs 39 is provided on the gripping portion 30 for the same purpose that the lug 38 is provided on the gripping portion 28. The lugs 39 are disposed in spaced apart relationship along the edge of the gripping portion 30 that is disposed away from the bendable connection 26, the lugs 39 projecting outwardly from the second gripping portion 30 in a direction towards the first gripping portion 28 and being disposed on either side of the lug 38 and in perpendicular relationship with but spaced from the bendable connection 26.

The fishing line 16 is gripped between the first lug 38 and the second gripping portion 30 and between the pair of second lugs 39 and the first gripping portion 28 in the gripping position of the gripping portions 28—30 whereby the fishing line 16 is securely held therebetween as is illustrated in FIGS. 6–8 of the drawing.

The sinker 20 is made of any malleable material having a density greater than that of water and is preferably made of lead or alloys thereof of the same general type used heretofore for sinkers.

The sinker 20 is applied to the fishing line 16 by placing the fishing line 16 between the first gripping portion 28 and the second gripping portion 30 in the first position thereof, i.e., that position illustrated in FIGS. 2–5 of the drawing. Thereafter, the fingers of the user are applied to the first wing 32 and the second wing 34 to deform the bendable connection 26 without the use of any tool so as to bring the gripping portions into the second position, as shown in FIGS. 6, 7 and 8. The fishing line 16 is securely gripped in this position between the first lug 38 and the second gripping portion 30 and between the lugs 39 and the first gripping portion 28.

When the user desires to remove the sinker 20 from the fishing line 16, the fingers of the user are applied to the first wing 28 and the second wing 30 to deform the bendable connection 26 without the use of any tool so as to cause the gripping portions to move into the first position thereof, i.e., that illustrated in FIGS. 2 to 5 of the drawing. The fishing line 16 is then released from the grip of the first lug 38 and the second gripping portion 30 and from the grip of the pair of second lugs 39 and the first gripping portion 28. The fishing line 16 can then be removed from between the facing gripping portions 28—30 in the first position thereof.

In view of the foregoing, it is apparent that there has been provided an improved sinker 20 which can be readily applied to and detached from a fishing line without the use of tools of any sort. The sinker 20 can also be re-used a reasonable number of times whereby to effect further economies. While there has been described what is at present considered to be the preferred embodiment of the invention, it will be understood that various modifications may be made therein, and it is intended to cover in the appended claims all such modifications as fall within the true spirit and scope of the invention.

I claim:

1. A sinker adapted securely to grip a fishing line and to cause the fishing line to assume a predetermined position in the water, comprising a first gripping portion and a second gripping portion disposed in facing relationship and normally spaced apart in a first position thereof to receive an associated fishing line therebetween, a bendable connection joining said gripping portions along one edge thereof, a first wing on the opposite edge of said first gripping portion and disposed substantially perpendicular thereto and projecting outwardly therefrom in a direction away from said second gripping portion, and a second wing on the opposite edge of said second gripping portion and disposed substantially perpendicular thereto and projecting outwardly therefrom in a direction away from said first gripping portion, said wings having a size substantially greater than said gripping portions so as readily to be grasped by the fingers of a user to facilitate movement of said gripping portions to a second position gripping an associated fishing line therebetween, the cross sectional area of said bendable connection being less than the cross sectional area of said gripping portions and said wings to insure preferential bending in said bendable connection in moving said gripping portions between the first and second positions thereof, whereby said sinker can be applied to an associated fishing line by the user placing the associated fishing line between said gripping portions in said first position thereof and the user thereafter grasping said wings with the fingers and deforming said bendable connection without the use of any tool to move said gripping portions to the second position thereof wherein said gripping portions securely grip the associated fishing line and said sinker can be removed from the associated fishing line by the user grasping said wings with the fingers and deforming said bendable connection without the use of any tool to move said gripping portion into said first position thereof to release the associated fishing line.

2. A sinker adapted securely to grip a fishing line and to cause the fishing line to assume a predetermined position in the water, comprising a first gripping portion and a second gripping portion disposed in facing relationship and normally spaced apart in a first position thereof to receive an associated fishing line therebetween, a bendable connection joining said gripping portions along one edge thereof, a first wing on the opposite edge of said first gripping portion and disposed substantially perpendicular thereto and projecting outwardly therefrom in a direction away from said second gripping portion, a second wing on the opposite edge of said second gripping portion and disposed substantially perpendicular thereto and projecting outwardly therefrom in a direction away from said first gripping portion, said wings having a size substantially greater than said gripping portions so as readily to be grasped by the fingers of a user to facilitate movement of said gripping portions to a second position gripping an associated fishing line therebetween, the cross sectional area of said bendable connection being less than the cross sectional area of said gripping portions and said wings to insure preferential bending in said bendable connection in moving said gripping portions between the first and second positions thereof, a first rib disposed between and interconnecting said first gripping portion and said first wing and disposed adjacent to said bendable connection and projecting outwardly therefrom in a direction away from said second gripping portion, said first rib stiffening said first gripping portion and said first wing, and a second rib disposed between and interconnecting said second gripping portion and said second wing and disposed adjacent to said bendable connection and projecting outwardly therefrom in a direction away from said first gripping portion, said second rib stiffening said second gripping portion and said second wing, whereby said sinker can be applied to an associated fishing line by the user placing the associated fishing line between said gripping portions in said first position thereof and the user thereafter grasping said wings with the fingers and deforming said bendable connection without the use of any tool to move said gripping portions to the second position thereof wherein said gripping portions securely grip the associated fishing line and said sinker can be removed from the associated fishing line by the user grasping said wings with the fingers and deforming said bendable connection without the use of any tool to move said gripping portion into said first position thereof to release the associated fishing line.

3. A sinker adapted securely to grip a fishing line and to cause the fishing line to assume a predetermined position in the water, comprising a first gripping portion and a second gripping portion having substantially planar surfaces disposed in facing relationship and normally spaced apart in a first position thereof to receive an associated fishing line therebetween, a lug on one of said gripping portions projecting outwardly therefrom in a direction toward the planar surface of the other gripping portion, a bendable connection joining said gripping portions along one edge thereof, a first wing on the opposite edge of said first gripping portion and disposed substantially perpendicular thereto and projecting outwardly therefrom in a direction away from said second gripping portion, and a second wing on the opposite edge of said second gripping portion and disposed substantially perpendicular thereto and projecting outwardly therefrom in a direction away from said first gripping portion, said wings having a size substantially greater than said gripping portions so as readily to be grasped by the fingers of a user to facilitate movement of said gripping portions to a second position wherein said lug grips an associated fishing line against said other gripping portion, the cross sectional area of said bendable connection being less than the cross sectional area of said gripping portions and said wings to insure preferential bending in said bendable connection in moving said gripping portions between the first and second positions thereof, whereby said sinker can be applied to an associated fishing line by the user placing the associated fishing line between said first lug and the planar surface of said other gripping portion in said first position of said gripping portions and the user thereafter grasping said wings with the fingers and deforming said bendable connection without the use of any tool to move said gripping portions to the second position thereof wherein said lug and the planar surface of said other gripping portion securely grip the associated fishing line and said sinker can be removed from the associated fishing line by the user grasping said wings with the fingers and deforming said bendable connection without the use of any tool to move said gripping portion into said first position thereof to release the associated fishing line.

4. A sinker adapted securely to grip a fishing line and to cause the fishing line to assume a predetermined position in the water, comprising a first gripping portion and a second gripping portion having substantially planar surfaces disposed in facing relationship and normally spaced apart in a first position thereof to receive an associated fishing line therebetween, a bendable connection joining said gripping portions along one edge thereof, a first lug on said first gripping portion projecting outwardly therefrom in a direction toward the planar surface of said second gripping portion and intermediate the ends of the edge thereof opposite said bendable connection, a pair of second lugs disposed in spaced apart relationship on said second gripping portion projecting outwardly therefrom in a direction toward the planar surface of said first gripping portion and disposed on either side of said first lug, a first semicircular wing on the opposite edge of said first gripping portion and disposed substantially perpendicular thereto and projecting outwardly therefrom in a direction away from said second gripping portion, and a second semicircular wing on the opposite edge of said second gripping portion and disposed substantially perpendicular thereto and projecting outwardly therefrom in a direction away from said first gripping portion, said wings having a size substantially greater than said gripping portions so as readily to be grasped by the fingers of a user to facilitate movement of said gripping portions to a second position gripping an associated fishing line therebetween, the cross sectional area of said bendable connection being less than the cross sectional area of said gripping portions and said wings to insure preferential bending in said bendable connection in moving said gripping portions between the first and second positions thereof, whereby said sinker can be applied to an associated fishing line by the user placing the associated fishing line between said first and second lugs on said gripping portions in said first position thereof and the user thereafter grasping said semicircular wings with the fingers and deforming said bendable connection without the use of any tool to move said gripping portions to the second position thereof wherein the planar surfaces of said gripping portions and said lugs securely grip the associated fishing line at a plurality of points therealong and said sinker can be removed from the associated fishing line by the user grasping said semicircular wings with the fingers and deforming said bendable connection without the use of any tool to move said gripping portion into said first position thereof to release the associated fishing line.

References Cited in the file of this patent

UNITED STATES PATENTS

| | | |
|---|---|---|
| 301,294 | Smith et al. | July 1, 1884 |
| 1,784,679 | Paterson | Dec. 9, 1930 |
| 2,904,924 | Tashiro | Sept. 22, 1959 |
| 2,941,324 | Waxgiser | June 21, 1960 |

FOREIGN PATENTS

| | | |
|---|---|---|
| 479,258 | Italy | Mar. 21, 1953 |